No. 790,902.

Patented May 30, 1905.

UNITED STATES PATENT OFFICE.

JOSHUA B. KIRKHAM AND WILLIAM E. PARMELY, OF BURLINGTON, KANSAS.

COMPOUND FOR EXTERMINATING VERMIN.

SPECIFICATION forming part of Letters Patent No. 790,902, dated May 30, 1905.

Application filed December 23, 1904. Serial No. 238,148.

*To all whom it may concern:*

Be it known that we, JOSHUA B. KIRKHAM and WILLIAM E. PARMELY, citizens of the United States, residing at Burlington, in the county of Coffey and State of Kansas, have invented a new and useful Compound for Exterminating Vermin, of which the following is a specification.

This invention relates to an insecticide or compound for exterminating lice, mites, and vermin in general, and has for its object to provide a powdered compound of this character which when dusted or otherwise sprinkled on poultry, hogs, sheep, and other animals will effectually destroy the parasites or vermin with which they are generally infested.

With this object in view the invention consists in a compound formed of the following ingredients, to wit: agatite, four pounds; naphthalene, one pound; sulfur, one pound; kaolin, one-half pound; Scotch snuff, one-third pound.

In preparing the compound the above ingredients are placed in a suitable receptacle and stirred together or otherwise thoroughly mixed, so that the several parts will be well blended, the mixture being subsequently sifted through a fine screen to remove the coarse particles.

Agatite is a mixture of gypsum and ground rock which when properly blended forms a heavy powder that will readily adhere to any object upon which it may be sifted or otherwise sprinkled.

The agatite takes the place of and has the same purifying as well as destructive qualities as slaked lime and being usually sold in a finely divided or powdered form will readily mix or blend with the other ingredients.

The powdered compound thus formed when used on hogs, sheep, calves, and other stock is preferably sifted on the animal's body and thoroughly rubbed into its hair or hide. When used for removing lice, mites, and other vermin from poultry, the compound is dusted or otherwise sprinkled on the floor and roosts of the poultry-house and the same also sifted in the several nests. It has also been found desirable to mix about one-half pound of the powdered compound with about one-half bushel of ashes and place the same in the poultry-house for the chickens to wallow in.

The above compound or powder used in the manner described will effectually destroy all forms of vermin and may be used with equally good results on carpets and clothing or for removing parasites from plants, trees, and flowers.

Having thus described the invention, what is claimed is—

1. The herein-described compound for destroying vermin consisting of agatite, naphthalene, sulfur, kaolin and Scotch snuff, the same being combined in the manner specified.

2. The herein-described compound for destroying vermin, consisting of agatite, four pounds; naphthalene, one pound; sulfur, one pound; kaolin, one-half pound; and Scotch snuff, one-third pound, the same being combined in the manner specified.

In testimony that we claim the foregoing as our own we have hereto affixed our signatures in the presence of two witnesses.

JOSHUA B. KIRKHAM.
WILLIAM E. PARMELY.

Witnesses:
J. H. RUDRAUFF,
FRANK PARMELY.